United States Patent
Rodriguez et al.

(10) Patent No.: US 11,363,892 B2
(45) Date of Patent: Jun. 21, 2022

(54) TWIN SLEEPER

(71) Applicant: Roadwire LLC, Austin, TX (US)

(72) Inventors: Leobardo Hernandez Rodriguez, El Sauzal (MX); Jose G. Hernandez, Jr., Temecula, CA (US)

(73) Assignee: Roadwire, LLC, Austin, TX (US)

( * ) Notice: Subject to any disclaimer, the term of this patent is extended or adjusted under 35 U.S.C. 154(b) by 442 days.

(21) Appl. No.: 16/597,783

(22) Filed: Oct. 9, 2019

(65) Prior Publication Data

US 2020/0113341 A1    Apr. 16, 2020

Related U.S. Application Data

(60) Provisional application No. 62/743,452, filed on Oct. 9, 2018.

(51) Int. Cl.
| | |
|---|---|
| A47C 17/17 | (2006.01) |
| A47C 11/00 | (2006.01) |
| A47C 7/62 | (2006.01) |
| A47C 17/16 | (2006.01) |
| B60N 2/75 | (2018.01) |
| B60N 2/34 | (2006.01) |

(52) U.S. Cl.
CPC .............. *A47C 17/17* (2013.01); *A47C 7/624* (2018.08); *A47C 11/005* (2013.01); *A47C 17/161* (2013.01); *B60N 2/34* (2013.01); *B60N 2/793* (2018.02)

(58) Field of Classification Search
CPC ....... A47C 17/17; A47C 17/00; A47C 11/005; A47C 17/16; A47C 17/161; A47C 7/624; B60N 2/793; B60N 2/34
See application file for complete search history.

(56) References Cited

U.S. PATENT DOCUMENTS

| | | |
|---|---|---|
| 1,030,731 A | 6/1912 | Jacobs |
| 1,062,337 A | 5/1913 | Kampe |
| 2,568,366 A | 9/1951 | Rosen |
| 2,582,555 A | 1/1952 | Miller |
| 2,730,727 A | 1/1956 | Schneller |
| 2,795,265 A | 6/1957 | Albrecht |

(Continued)

FOREIGN PATENT DOCUMENTS

| | | |
|---|---|---|
| CN | 202874592 | 4/2013 |
| CN | 208403782 | 1/2019 |

(Continued)

OTHER PUBLICATIONS

Welton Healthcare, Wellton Healthcare Bed Cum Chair Type.
Foreign Language Reference Discussion.
Spreadsheet with additional references.

*Primary Examiner* — Fredrick C Conley
(74) *Attorney, Agent, or Firm* — J. Roger Williams, Jr.

(57) ABSTRACT

A chair that converts into a bed. The chair includes a sleeper frame assembly with a back frame assembly coupled with a hinge to a rear frame assembly. A sliding coupling connects the back frame assembly to a moveable seat assembly with a seat frame assembly. The sliding coupling includes a slotted bracket which may include a flanged beam. When the moveable seat assembly is moved forward, the back frame assembly and rear frame assembly unfold into planar alignment with the seat frame assembly, whereby cushions on each frame assembly form a bed.

19 Claims, 11 Drawing Sheets

(56) References Cited

U.S. PATENT DOCUMENTS

| | | | |
|---|---|---|---|
| 3,867,730 A | 2/1975 | Wright | |
| 4,292,697 A | 10/1981 | Alembik | |
| 4,343,508 A | 8/1982 | Heling | |
| 4,378,609 A | 4/1983 | Patterson | |
| 4,402,096 A | 9/1983 | Atimchuk | |
| 4,628,551 A | 12/1986 | Atimchuk | |
| 5,153,951 A | 10/1992 | Hester | |
| 5,327,591 A | 7/1994 | Fireman | |
| 5,373,591 A | 12/1994 | Myers | |
| 5,779,310 A * | 7/1998 | Suskey | A47C 17/16 297/118 |
| 5,848,821 A * | 12/1998 | Kirby | A47C 17/04 297/232 |
| 5,913,770 A * | 6/1999 | Tseng | A47C 17/17 5/52 |
| 6,058,853 A | 5/2000 | Pinch | |
| 6,427,262 B1 | 8/2002 | Huang | |
| 6,463,603 B1 * | 10/2002 | Camfield | A47C 17/50 5/21 |
| 6,668,395 B1 | 12/2003 | Sufang | |
| 7,350,850 B2 | 4/2008 | Rasmussen | |
| 9,302,629 B1 | 4/2016 | Hall et al. | |
| 9,415,703 B2 | 8/2016 | Slungare et al. | |
| 2008/0066227 A1 | 3/2008 | James et al. | |
| 2008/0092290 A1 * | 4/2008 | Cabrera | A47C 17/132 5/47 |
| 2011/0049956 A1 | 3/2011 | Spivey et al. | |
| 2012/0047647 A1 * | 3/2012 | Steers | A47C 27/082 5/13 |
| 2014/0101846 A1 | 4/2014 | Garland | |

FOREIGN PATENT DOCUMENTS

| | | |
|---|---|---|
| DE | 4312666 A | 7/1995 |
| EP | 0631749 B1 | 12/1996 |
| RU | 2661827 C1 | 7/2018 |

\* cited by examiner

TWIN SLEEPER

The present application incorporates by reference in its entirety U.S. Provisional Patent Application 62/743,452, filed Oct. 9, 2018.

BACKGROUND OF THE INVENTION

Structures such as houses, apartments, and the like are used to provide shelter from the elements. In addition to these immobile structures, mobile structures such as aircraft, ships, boats, and land-based mobile structures, including trucks, vans, busses, mobile homes, and recreational vehicles, have been used to effectively shelter and/or transport people. Many of these structures provide not only shelter but also living quarters.

Space is at a premium in many of these mobile structures. In the past, there have been attempts to more effectively utilize the space inside structures by using seating structures, such as chairs, seats, sofas, and couches, that can be easily converted to beds for sleeping and then converted back into a seating position. Unfortunately, previous designs for a seating structure that converts to a bed (a sleeper), have proven to be unreliable, heavy, and/or expensive to build, often because of an excessive number of unique parts or moving parts, or because the design is not compatible with design elements of other components such as upholstery. Accordingly, it would be desirable to provide an improved design with fewer moving parts, and with modular components that are compatible with other manufacturing processes, to produce a sleeper that is reliable, lightweight, and easy and inexpensive to manufacture.

BRIEF SUMMARY OF THE INVENTION

Disclosed is a twin sleeper, comprising a twin sleeper frame and a divider interposed between first and second sleeper frame assemblies. A sleeper frame assembly comprises a rear frame assembly, a back frame assembly coupled to the rear frame assembly, and a moveable seat assembly comprising a support bracket and a seat frame assembly. A sliding coupling connects the back frame assembly to the support bracket, wherein the sliding coupling comprises one or more slotted brackets. In embodiments, the slotted bracket comprises a flanged beam and nests within the support bracket. In the closed position of the sleeper frame assembly, the back frame assembly and rear frame assembly are folded together. In the extended position of the sleeper frame assembly, the back frame assembly and rear frame assembly are unfolded and aligned with the seat frame assembly such that the upper surfaces of the back frame, rear frame, and seat frame assemblies define a longitudinally-extending substantially planar bed frame. In the extended position, cushions on each seat frame assembly form a bed.

BRIEF DESCRIPTION OF THE DRAWINGS

This application includes the attached FIGS. 1-18, wherein.

DETAILED DESCRIPTION

Figure 8:
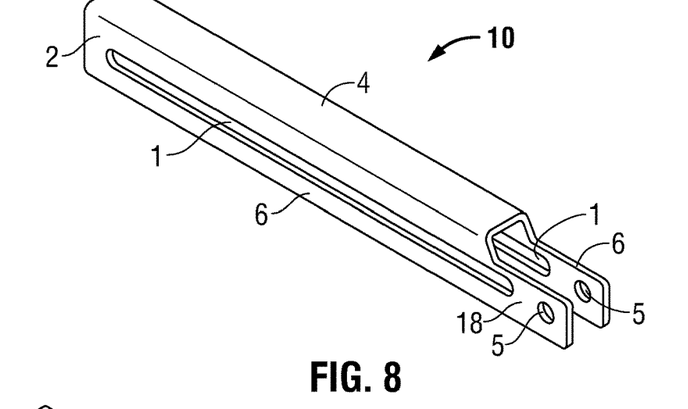
FIG. 8 illustrates an exemplary slotted bracket.

FIG. 8 illustrates an exemplary slotted bracket 10. Slotted bracket 10 in an embodiment is a longitudinally-extending flanged beam comprising two flanges or walls 6, each with a longitudinally-extending bracket slot or opening 1, a forward end 2, and web 4. At opposite end 18 of slotted bracket 10 (opposite of forward end 2) are disposed clearance holes 5 in each of the flanges 6. In an embodiment, slotted bracket 10 is made from a C-channel or U-channel steel beam, and a portion of web 4 at opposite end 18 proximal to clearance holes 5 has been cut-out to increase the pivoting radius of slotted bracket 10 around the axis defined by clearance holes 5.

Figure 9:
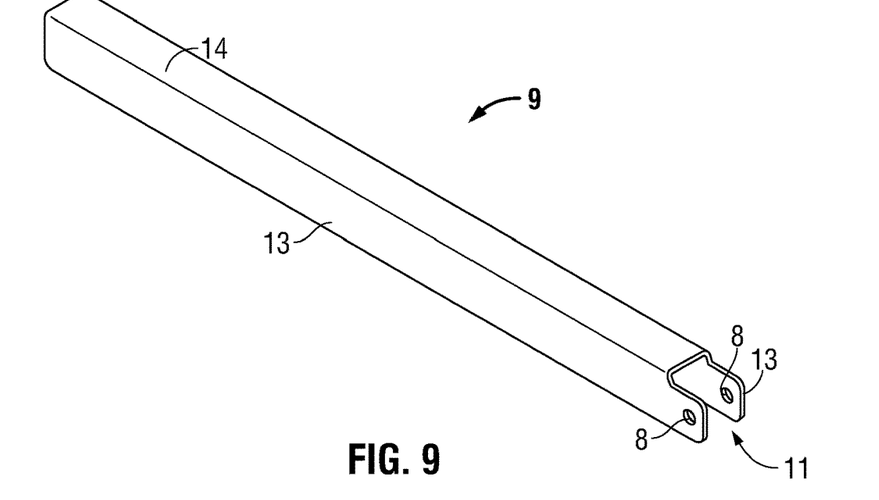
FIG. 9 illustrates an exemplary support bracket.

FIG. 9 illustrates an exemplary support bracket 9. Support bracket 9 in an embodiment is a longitudinally-extending flanged beam comprising two flanges or walls 13, clearance holes 8 disposed in each of the flanges 13 at the rear end of support bracket 9, web 14 adjoining flanges 13, and a longitudinally-extending internal cavity 11 defined by the interior of flanges 13 and web 14. In an embodiment, support bracket 9 is made from a C-channel or U-channel steel beam. In an embodiment, the internal width dimensions of cavity 11 exceed the external width dimensions of slotted bracket 10 so that slotted bracket 10, or a substantial portion thereof, can nest longitudinally within cavity 11.

Figure 10:
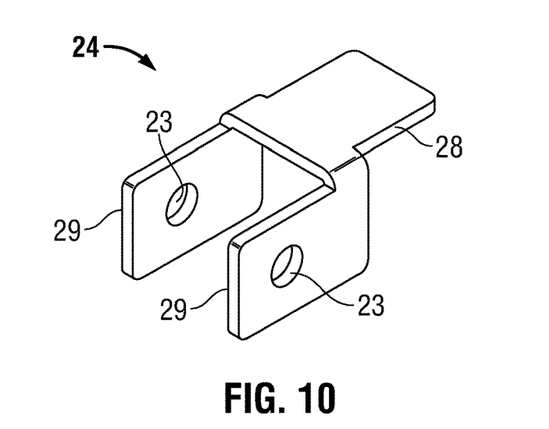
FIG. 10 illustrates an exemplary bracket.

FIG. 10 illustrates an exemplary bracket 24. Bracket 24 has a securing tab with an affixing surface 28 adapted and configured to be affixed to a seat frame assembly described herein, and clearance holes 23 in parallel planar side walls 29. Clearance holes 23 are preferably aligned to receive a pivot bolt or pin.

Figure 1:
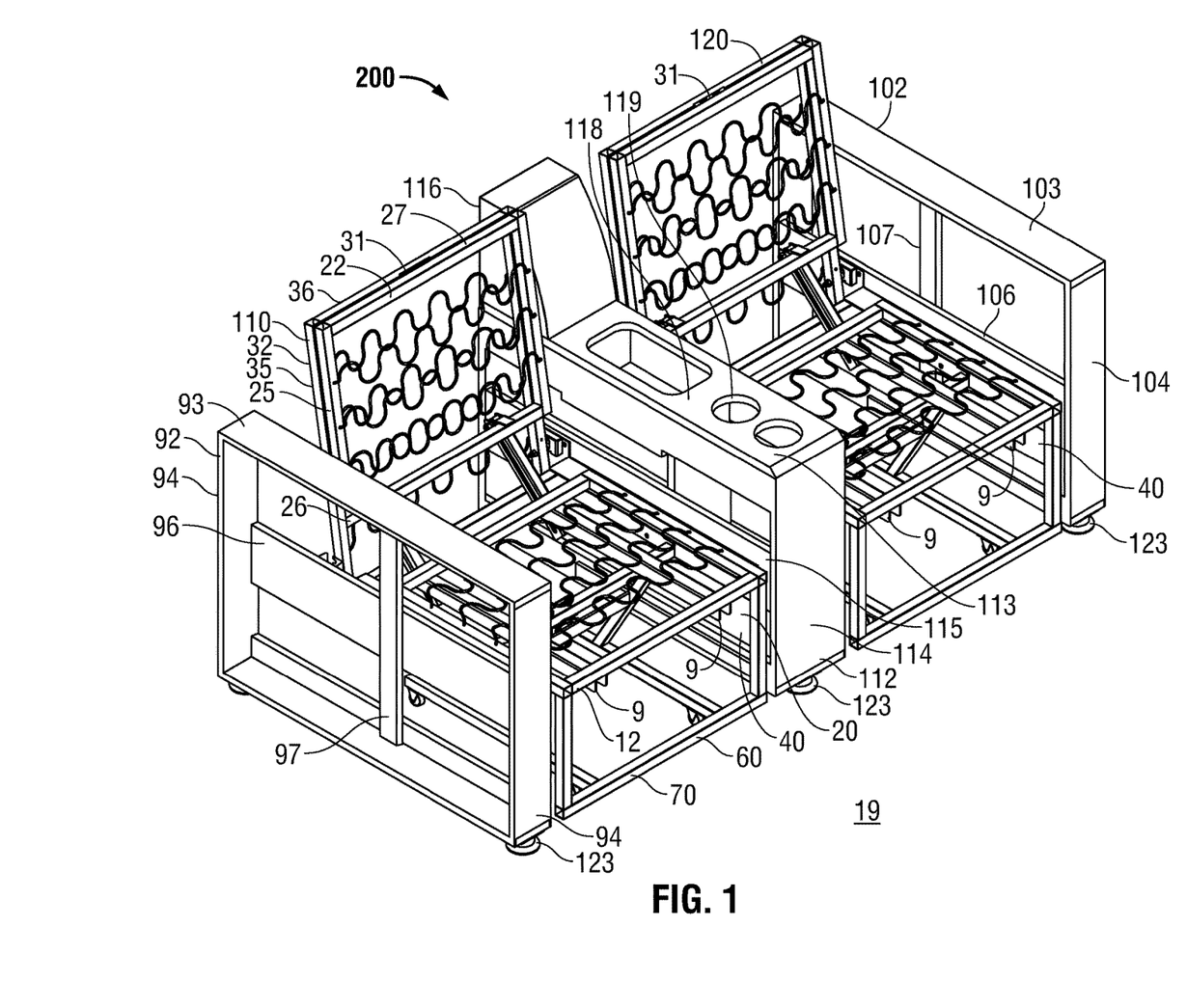
FIG. 1 is a perspective view of an exemplary twin sleeper with two convertible sleeper frames.

FIG. 1 illustrates an exemplary twin sleeper 200. Twin sleeper 200 includes left side frame 92, right side frame 102, and divider 112, with sleeper frame assembly 110 interposed between left side frame 92 and center frame 112, and sleeper frame assembly 120 interposed between divider 112 and right side frame 102. Side frames 92, 102, and divider 112 preferably are supported by steel furniture legs 123. Twin sleeper 200 includes a twin sleeper frame 20 whose elements include, in an embodiment, left side frame 92, right side frame 102, divider 112, crossbars 45 and 46 (not shown)

connecting each side frame 92, 102 to divider 112, and legs 123. Preferably, legs 123 hold twin sleeper frame 20 in place relative to floor or support platform 19.

Left side frame 92 includes vertical frame members 94, top rail 93, and, in an embodiment, strut 97 and crosspiece 96. Right side frame 102 includes vertical frame members 104, top rail 103, and, in an embodiment, strut 107 and crosspiece 106. In an embodiment, some or all of the components of side frames 92, 102 are made of wood, wood composite, particle board, or plywood. In an alternative embodiment some or all of the components of side frames 92, 102 are made of metal, for example steel tubing or steel beams.

Divider 112, in an embodiment, includes a center console 113, forward vertical support 114, left crosspiece 115, rear vertical support 116, right crosspiece 117 (not shown), console surface 118, and console compartments 119, for example, cup holders. In an embodiment, some or all of the components of divider 112 and console 113 are made of wood, wood composite, particle board, or metal, for example steel tubing or steel beams.

Sleeper frame assembly 110 includes rear frame assembly 32, back frame assembly 22, and moveable seat assembly 70, including seat carriage 60, support bracket 9, and seat frame assembly 12. Rear frame assembly 32 is pivotably connected on one side to plate 41 of rear support framework 40 affixed to left crosspiece 115 of divider 112 and, on the other side, to a similar rear support framework (not shown) affixed to left side frame 92. In an embodiment, hinge 31, preferably a piano hinge, couples together top rail 36 of rear assembly 32 to top rail 27 of back frame assembly 22. Slotted brackets 1 couple together brackets 24 on bottom rail 26 of back frame assembly 22 with support brackets 9 of moveable seat carriage 70.

As shown in FIG. 1, sleeper frame assemblies 110 and 120 are in closed position (or chair position), in which hinge 31 is fully closed, rear frame assembly 32 and back frame assembly 22 are folded over each other, back frame side rails 25 are adjacent to rear frame side rails 35, and back frame top rail 27 is adjacent to rear frame assembly top rail 36.

Figure 2:
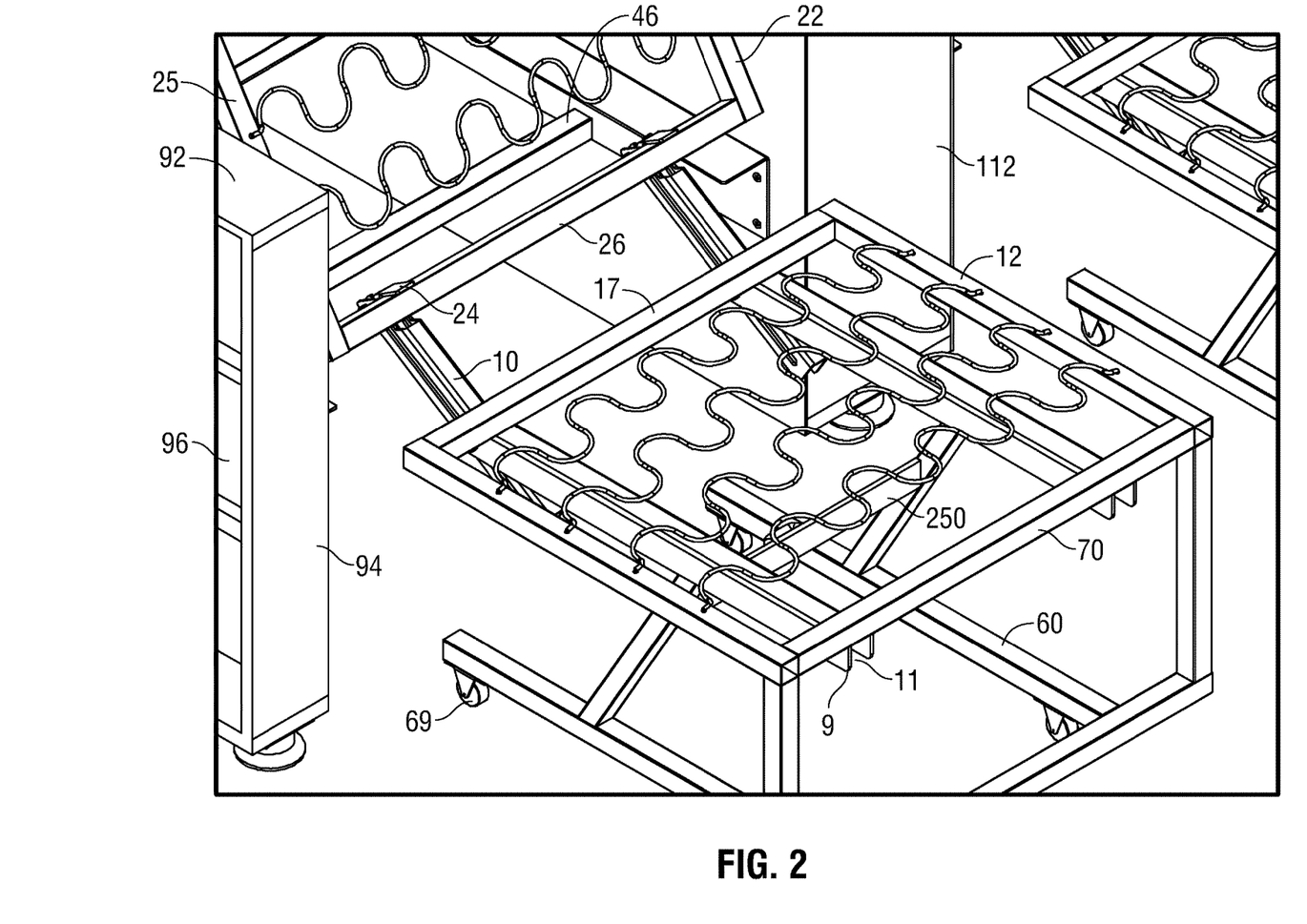
FIG. 2 is a perspective view of an exemplary sleeper frame assembly in a partially extended position.

FIG. 2 shows exemplary sleeper frame assembly 110 in a partially extended position in which seat carriage 60 has been pulled or moved forward. In the partially-extended position shown in FIG. 2, hinge 31 (not shown) is partially open, rear frame assembly 32 (not shown) and back frame assembly 22 have begun to unfold around hinge 31, and back frame side rails 25 and back frame bottom rail 26 have begun to pivot away from, respectively, rear frame side rails 35 (not shown) and rear frame rear rail 37 (not shown).

Figure 3:
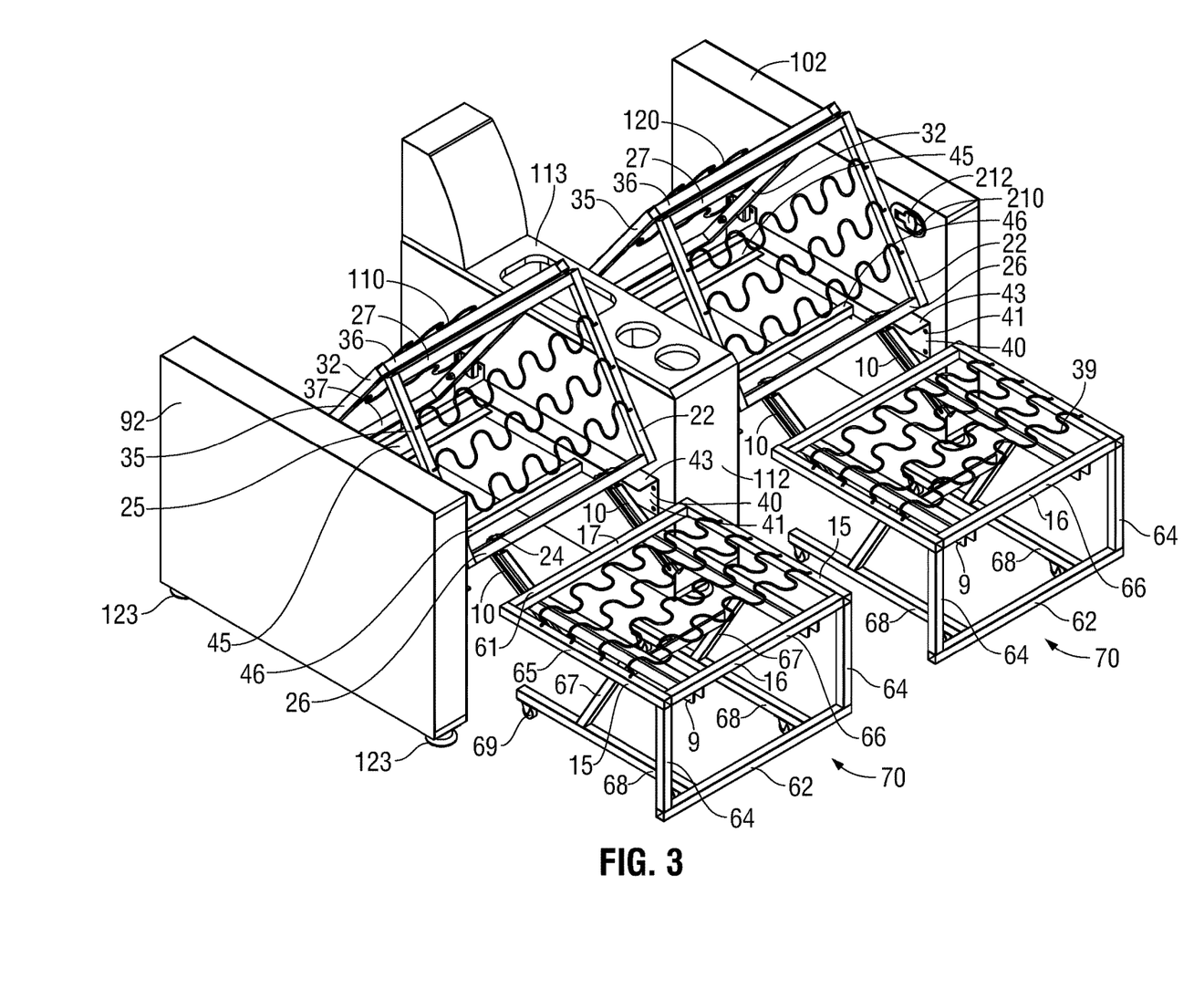
FIG. 3 is an alternate perspective of exemplary sleeper frame assemblies in another partially extended position.

FIG. 3 shows exemplary sleeper frame assemblies 110 and 120 in a more fully extended position compared to FIG. 2. FIG. 3 illustrates moveable seat assembly 70 and its elements, including seat carriage 60, support bracket 9, rear casters 69, vertical frame members 64, seat carriage upper side rails 65, seat carriage upper forward rail 66, seat carriage upper rear rail 61, seat carriage lower forward rail 62, seat carriage lower side rails 68, and seat carriage struts 67. In an embodiment seat carriage strut 67 is joined to lower side rail 68 and supports support bracket 9. Also shown in FIG. 3 are the components of seat frame assembly 12, including seat frame assembly side rails 15, seat frame assembly forward rail 16, and seat frame assembly rear rail 17. In an embodiment, the rail and strut components of seat carriage 60 and seat frame assembly 12 are made of steel tubing, steel beams, or other metals.

Seat frame assembly 12, back frame assembly 22, and rear frame assembly 32 preferably are rectangular in shape, with longer side rail dimensions, and define a substantially planar surface. In an embodiment, the side rails of rear frame assembly 32 are longer than the side rails of back frame assembly 22. Each seat frame assembly includes upholstery springs 39, zig zag springs in an embodiment, to support cushions.

In an embodiment, seat carriage 60 and seat frame element 12 are integrated, and the same beam or other structure member serves as upper side rail 65 and seat frame assembly side rail 15, the same beam or other structure member serves as upper forward rail 66 and seat frame assembly forward rail 16, and the same beam or other structure member serves as upper rear rail 61 and seat frame assembly rear rail 17. In an alternative embodiment, seat carriage 60 and seat frame element 12 are not integrated, and some or all of upper side rail 65 and seat frame assembly side rail 15, upper forward rail 66 and seat frame assembly forward rail 16, and upper rear rail 61 and seat frame assembly rear rail 17, are different structural elements.

FIG. 3 also illustrates portions of rear support framework 40, including support plate 41 affixed to divider 112, rear crossbar 45, and forward crossbar 46. Rear crossbar 45 and forward cross bar 46 are affixed to support plate 41 and to a similar support plate (not shown) affixed to left side frame 92.

Support bracket 9 extends longitudinally between rear rail 17 and forward rail 16 of seat frame assembly 12. In an embodiment, support bracket 9 is affixed to rear rail 17 and forward rail 16 of seat frame assembly 12, and in an alternative embodiment, support bracket 9 is affixed to upper rear rail 61 and upper forward rail 66 of seat carriage 60.

FIG. 3 also illustrates exemplary slotted brackets 10 coupling support bracket 9 to bracket 24 affixed to bottom rail 26 of back frame assembly 22. In an embodiment, twin sleeper 200 includes a latch 230 (not shown), actuating lever assembly 210, and actuating lever 212. Latch 230 secures seat carriage 60, and pulling actuating lever 212 will open latch 230 to release seat carriage 60. Once seat carriage 60 has been released, frame assembly 110 can be extended by pulling seat carriage 60 forward by tugging on a strap (not shown).

Figure 4:
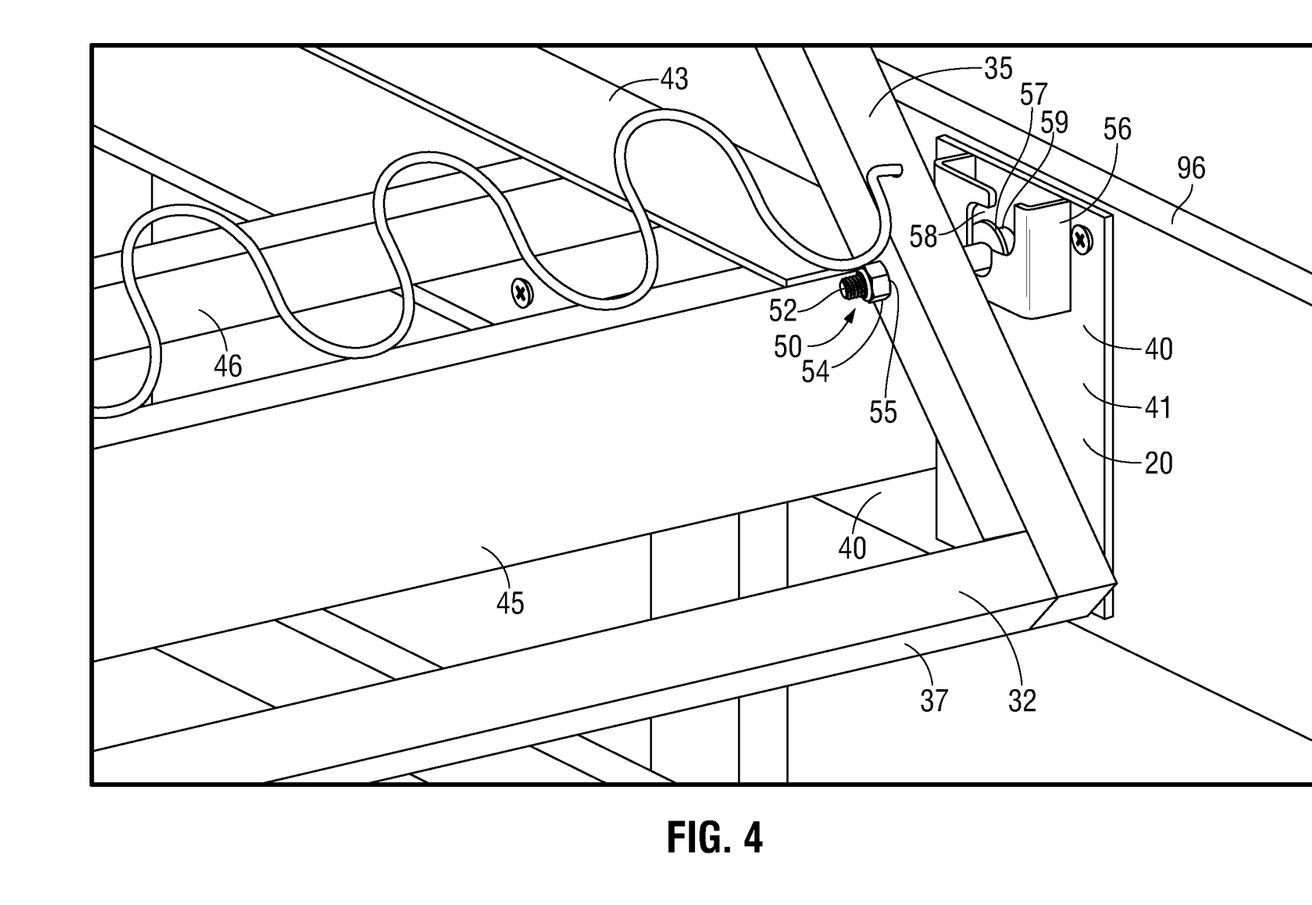
FIG. 4 is a perspective view of an exemplary pivot.

FIG. 4 is a perspective view of an exemplary rear pivot 50. In an embodiment, rear pivot 50 couples rear frame assembly 32 to plate 41, rear support framework 40, and sleeper frame 20. Rear pivot 50 includes pin 52, nut or other retaining element 54, and pivot bracket 56 with rounded slot or cutout 58. In an embodiment pin 52 is a steel bolt. Pin 52 extends through rear frame pivot clearance holes 55 and into rounded slot 58 where it spins within bearing 57 retained by bolt head 59. Preferably pivot bracket 56 is integrated with or affixed to rear support plate 41. Support plate 41 in an embodiment is an L-shaped steel plate with an upper support surface 43. As illustrated in FIG. 4, support plate 41 is affixed to cross piece 96 of left side frame 92, and rear crossbar 45 and forward crossbar 46 are affixed to support plate 41 and extend to, and are affixed to, a support plate affixed to divider 112 (not shown). The support plate affixed to divider 112 is part of a rear support framework similar to rear support framework 40, with a pivot bracket similar to pivot bracket 56, pivot pin similar to pivot pin 52, and support surface similar to support surface 43. Rear frame assembly 42 pivots around the axis defined by pivot pin 52 on left side frame 92 and the corresponding similar pivot pin of the rear support framework (not shown) affixed to divider 112. In an embodiment, when sleeper frame assembly 110 is extended to its full position or final position, side rails 35 of rear frame assembly 32 are supported on or by upper support surfaces 43 affixed to left side frame 92 and corresponding support surfaces affixed to divider 112 (not shown).

Figure 5:
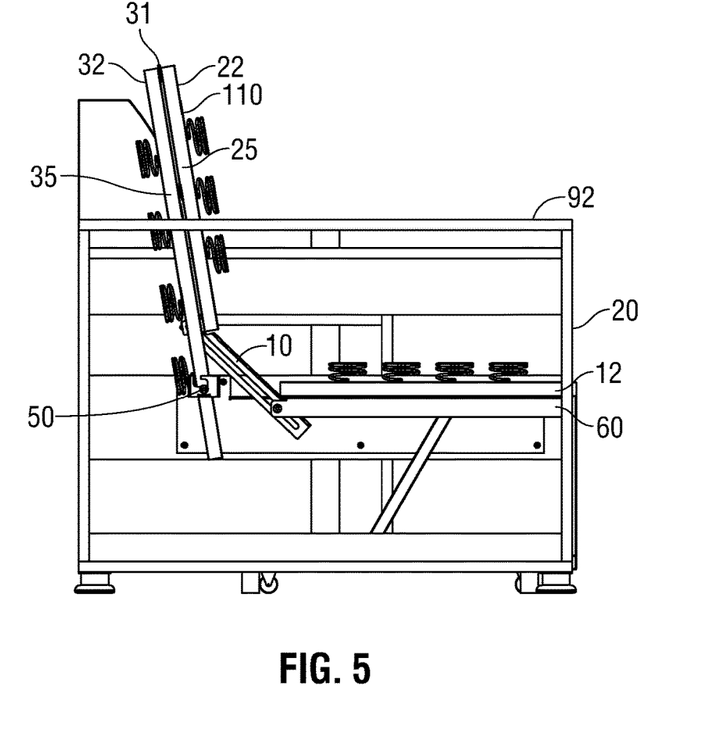
FIG. 5 is a side view of an exemplary sleeper frame assembly in a closed position.
Figure 6:
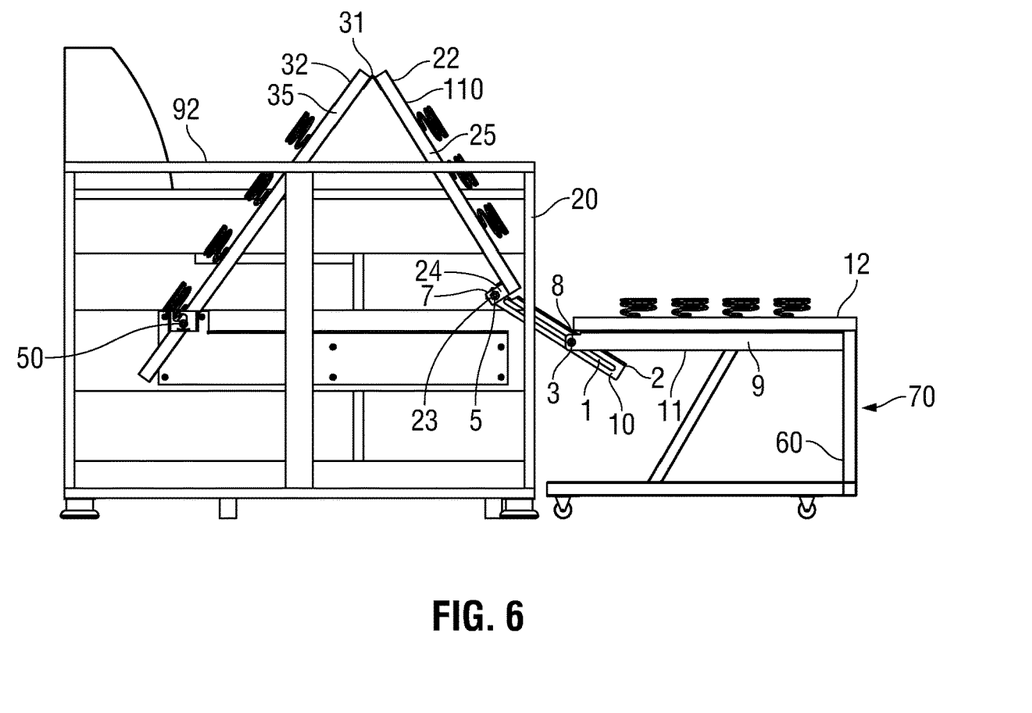
FIG. 6 is a side view of an exemplary sleeper frame assembly in a partially extended position.
Figure 7:
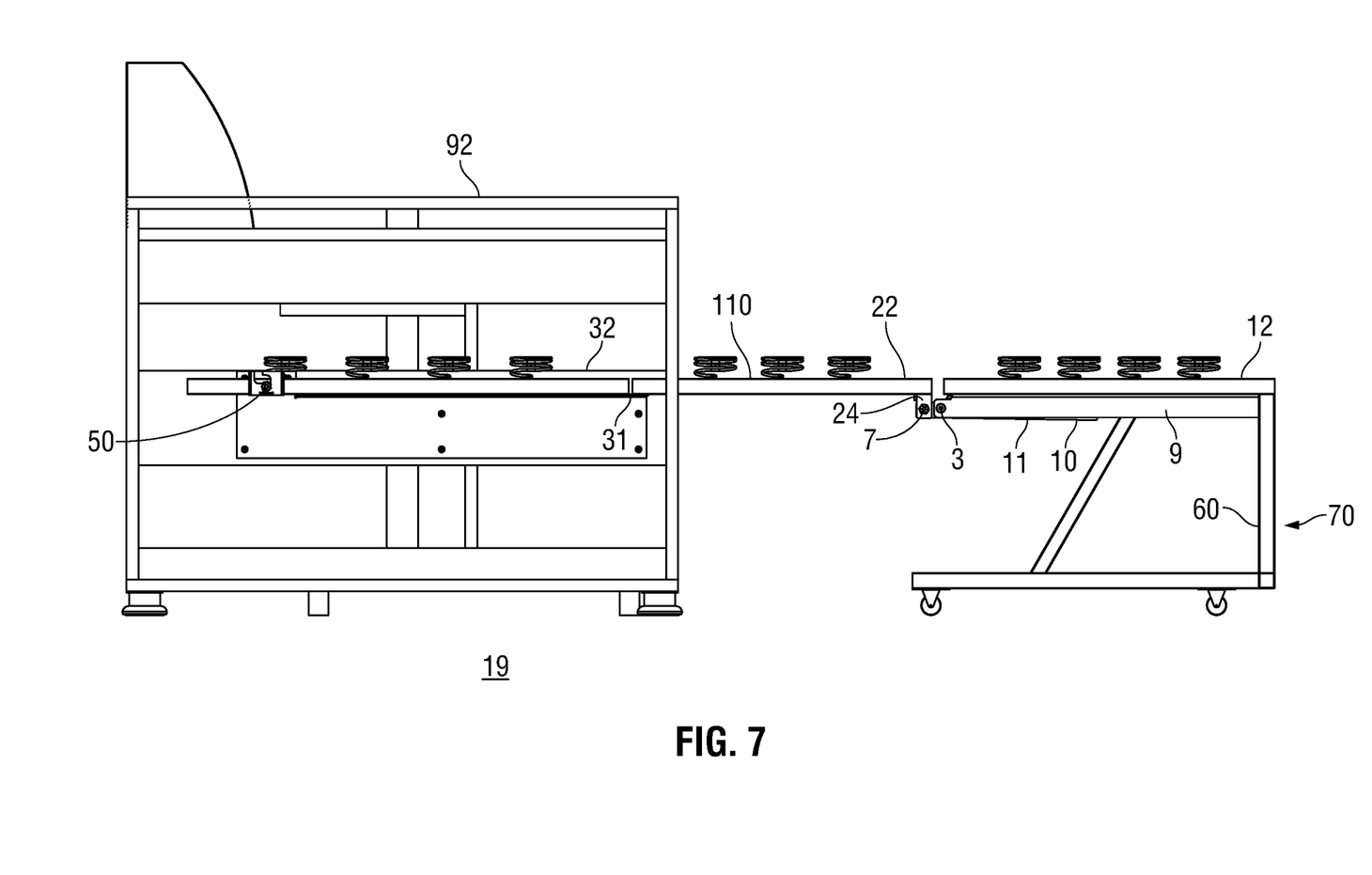
FIG. 7 is a side view of an exemplary sleeper frame assembly in a final extended position.

FIGS. 5, 6, and 7 provide side views of exemplary sleeper frame assembly 110 as it transitions from a closed position through a partially extended to a final extended position. FIG. 5 shows sleeper frame assembly 110 in a closed position. Hinge 31 is closed, rear frame assembly 32 and back frame assembly 22 are adjacent to each other, and seat carriage 60 is nested inside twin sleeper frame 20.

FIG. 6 shows sleeper frame assembly 110 in a partially extended position. Hinge 31 is partially open and side rails 25 of back frame assembly 22 have pivoted away from side rails 35 of rear frame assembly 32. Seat carriage 60 has moved or been pulled forward relative to twin sleeper frame 20. Affixing surface 28 (not shown) of bracket 24 is affixed to bottom rail 26 (not shown) of back frame assembly 22. Pivot pin 7 extends through clearance holes 23 of bracket 24 and clearance holes 5 in the rear end of slotted bracket 10. Sliding pin 3 extends through clearance holes 8 in the rear end of support bracket 9 and through slot 1 in slotted bracket 10. In an embodiment pins 7 and 3 are steel bolts. As seat carriage 60 moves forward, bottom rail 26 (not shown) of back frame assembly 22 pivots forward, sliding pin 3 slides in bracket slot 1, and forward end 2 of slotted bracket 10 pivots into cavity 11 in support bracket 9.

In FIG. 7, hinge 31 is open, rear frame assembly 32 is supported on support surface 43 (not shown), and seat carriage 60 has been moved so that pin 3 slides longitudinally in slot 1 until pin 3 is adjacent to pin 7. In this position, slotted bracket 10, including slot 1, is nested within cavity 11. The upper surfaces of frame assemblies 32, 22, and 12 are horizontally aligned to create a planar surface parallel to support surface 19, thereby making a planar surface suitable for a mattress, cushions, or a bed.

As the twin sleeper may be installed in a mobile vehicle (such as a recreational vehicle), it is desirable to prevent the moveable seat assembly from inadvertently moving and extending a sleeper frame assembly. Preferably, a latch may be used to prevent inadvertent movement of the moveable seat assembly. In an alternative embodiment, the moveable seat assembly is held in place by a forward stop bar and a rear stop bar which block movement of the casters on the wheel carriage.

Figure 11:
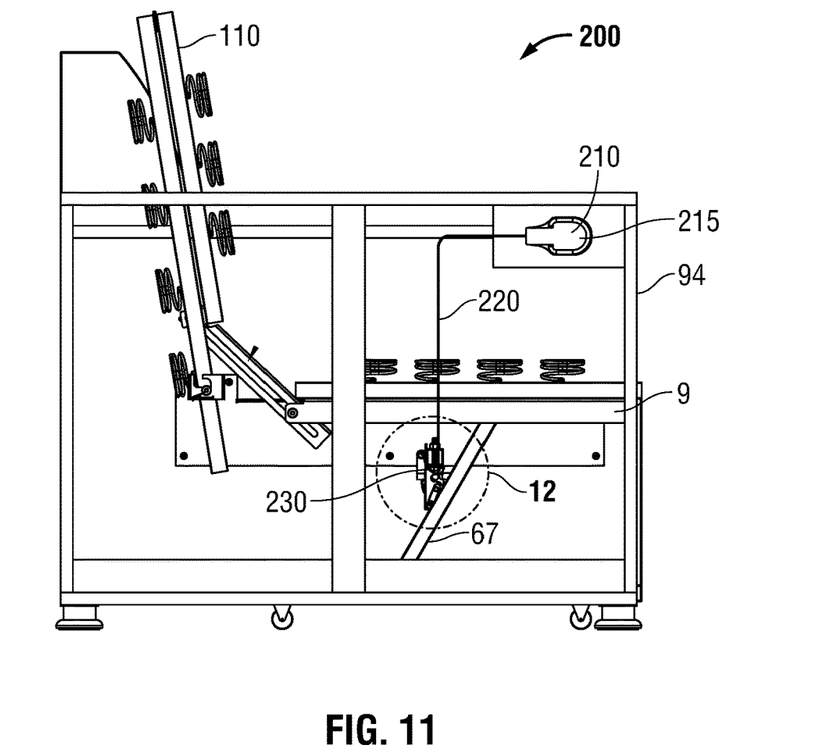
FIG. 11 is a side view of an exemplary sleeper frame assembly with a latch.
Figure 12:
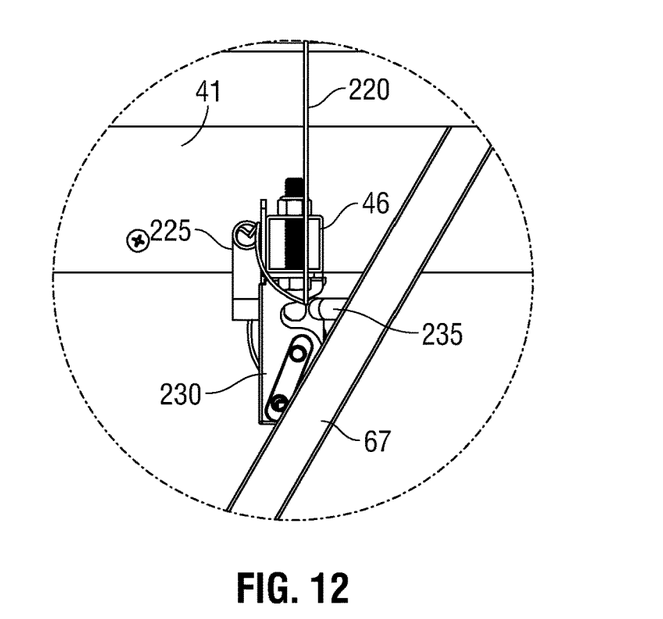
FIG. 12 Is a side view of an exemplary latch.
Figure 13:
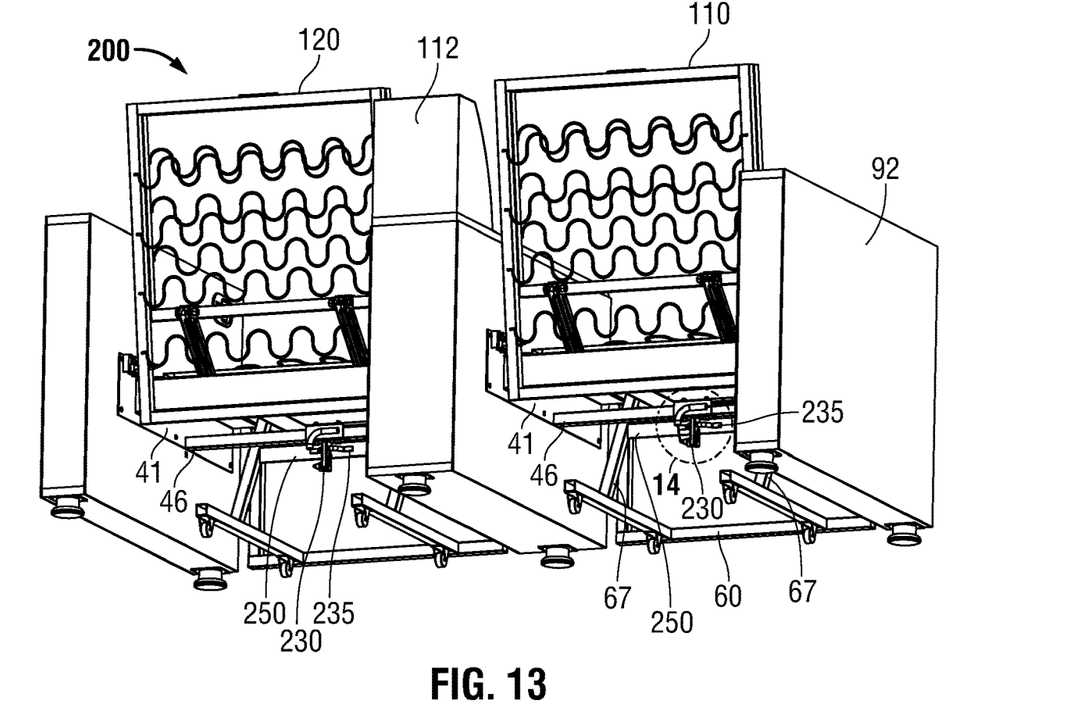
FIG. 13 is a perspective view of exemplary sleeper frame assemblies in a latched position.
Figure 14:
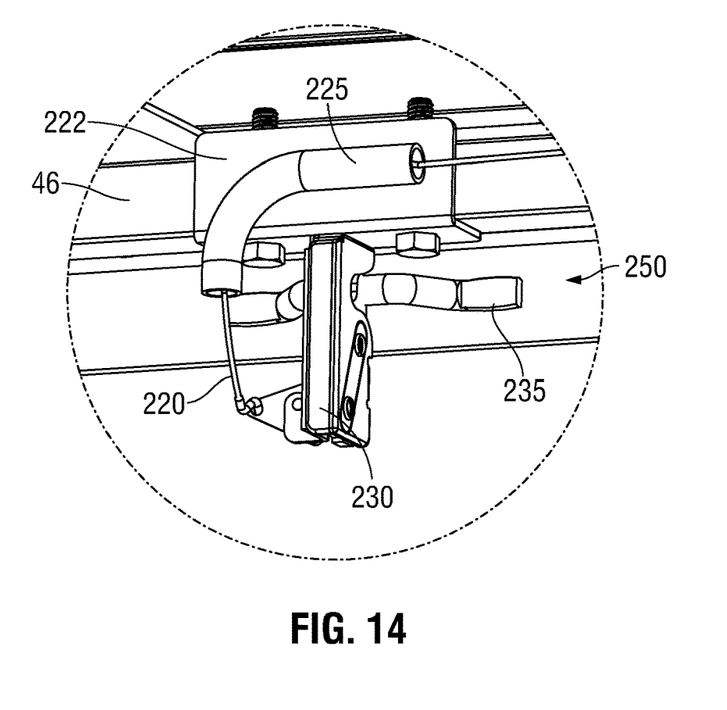
FIG. 14 is a perspective view of an exemplary latch coupling.

FIG. 11 shows sleeper frame assembly 110, the rear portion 215 of actuating lever assembly 210 (which in an embodiment is concealed within the side frame), actuator cable 220, and latch 230. FIG. 12 is a detailed side view of latch 230 including actuator cable shielding 225 and handle 235 mounted on bar 250 (not shown) that extends between left and right struts 67. Preferably latch 230 is a rotary latch. FIG. 14 shows an alternate perspective of latch 230 with actuator cable 220, actuator cable shielding 225, and handle 235. Handle 235 is mounted on bar 250, which in an embodiment is a flat steel bar that extends between and is affixed to left and right struts 67 of seat carriage 60. Latch 230 is affixed to plate 222 which is preferably bolted or otherwise affixed to forward crossbar 46. Handle 235 is preferably welded to bar 250. FIG. 13 shows an alternate perspective of sleeper frame assemblies 110 and 120 in a closed position, with bar 250 extending between struts 67 of seat carriage 60, actuator cable shielding 225, and latch 230 affixed to forward crossbar 46 extending between plate 41 and a similar plate affixed to side frame 92 (not shown).

FIGS. 13 and 14 show latch 230 securely holding or gripping handle 235, thereby preventing seat carriage 60 from moving away from twin sleeper frame 20 when the sleeper frame assembly is in a closed position. When tension is applied to actuator cable 220 by actuator lever 212 (not shown), latch 230 releases handle 235, and seat carriage 60 can move forward relative to twin sleeper frame 20 to extend the sleeper frame assembly.

Twin sleeper 200 includes two chairs when sleeper frame assemblies 110 and 120 are in the closed position and cushions are provided. In an embodiment, the cushions are foam cushions covered in leather, vinyl, plastic, or similar coverings. In an embodiment, each cushion is fastened or affixed to a seat frame assembly and supported by or on seat frame assembly springs. Exemplary cushion fasteners include screws, rivets, straps, bolts, wires, staples, tape, adhesive, plastic ties, hook-and-loop fasteners, snap-fasteners, and any other conventional furniture fastener.

Figure 15:
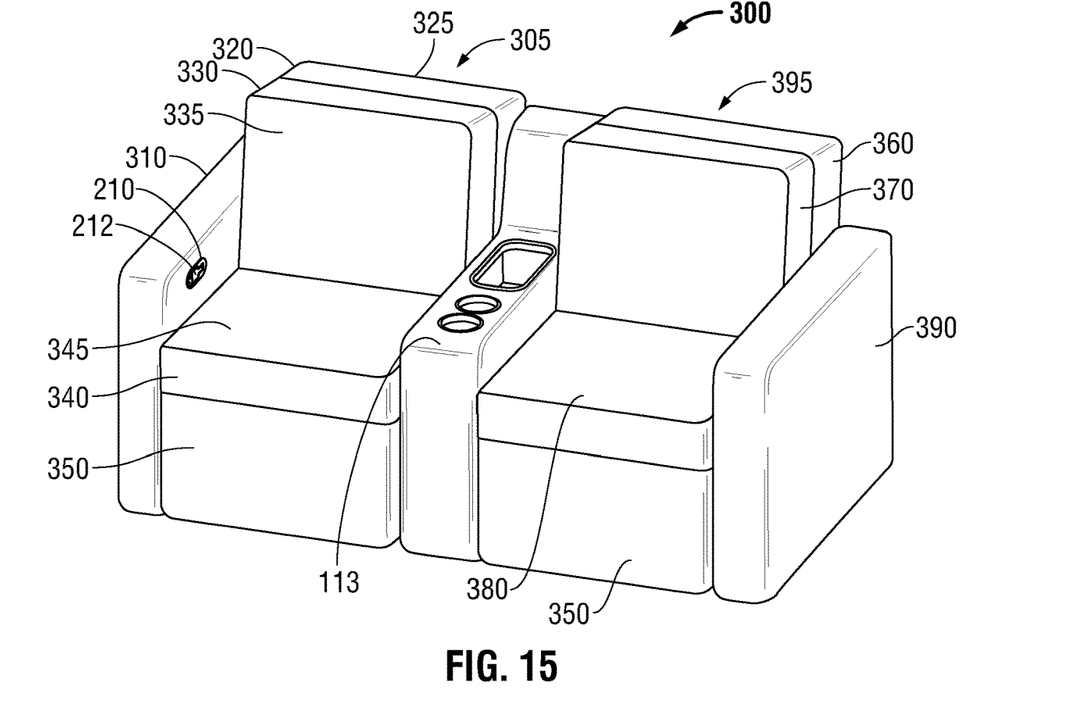
FIG. 15 is a perspective view of an exemplary twin sleeper in a closed position.

Twin sleeper 200, as shown in FIG. 15, includes cushions disposed on sleeper frame assemblies 110 and 120 (not shown) in the closed position. Left chair 305, interposed between left chair side 310 and console 113, includes rear cushion 320 with rear cushion upper surface 325, back cushion 330 with back cushion upper surface 335, seat cushion 340 with seat cushion upper surface 345, and front piece 350. Right chair 395, interposed between right chair side 390 and console 113, includes rear cushion 360, back cushion 370, and seat cushion 380. Also shown in FIG. 15 is actuating lever assembly 210 and actuating lever 212.

Figure 16:
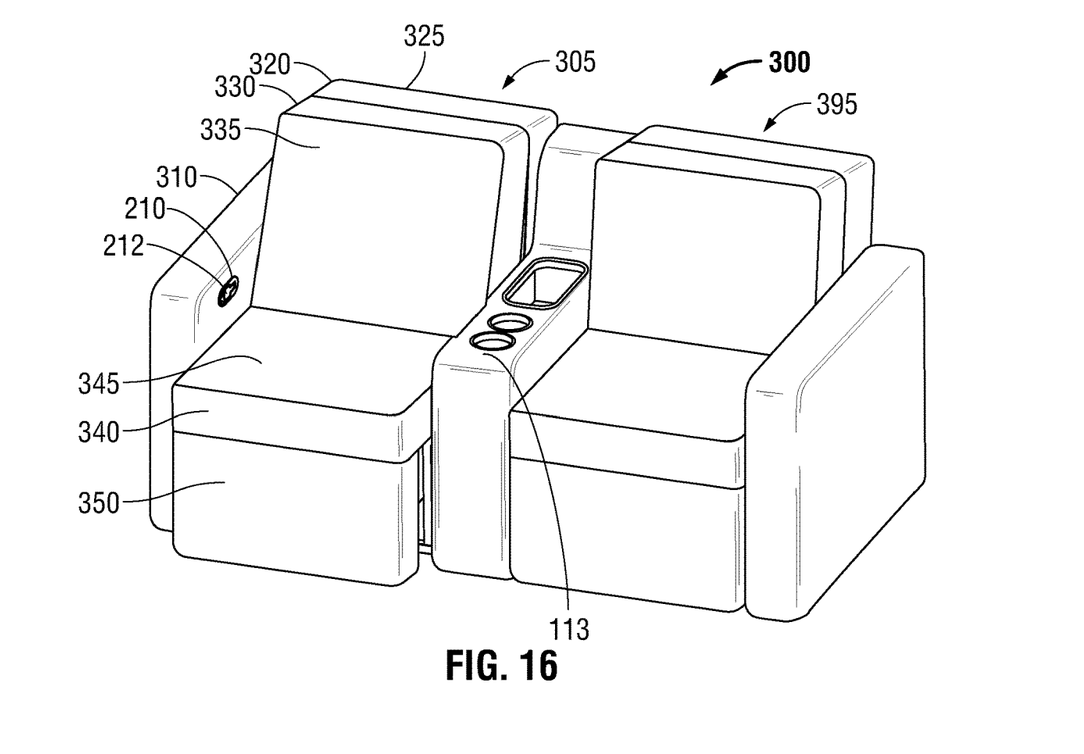
FIG. 16 is a perspective view of an exemplary twin sleeper in a partially extended position.
Figure 17:
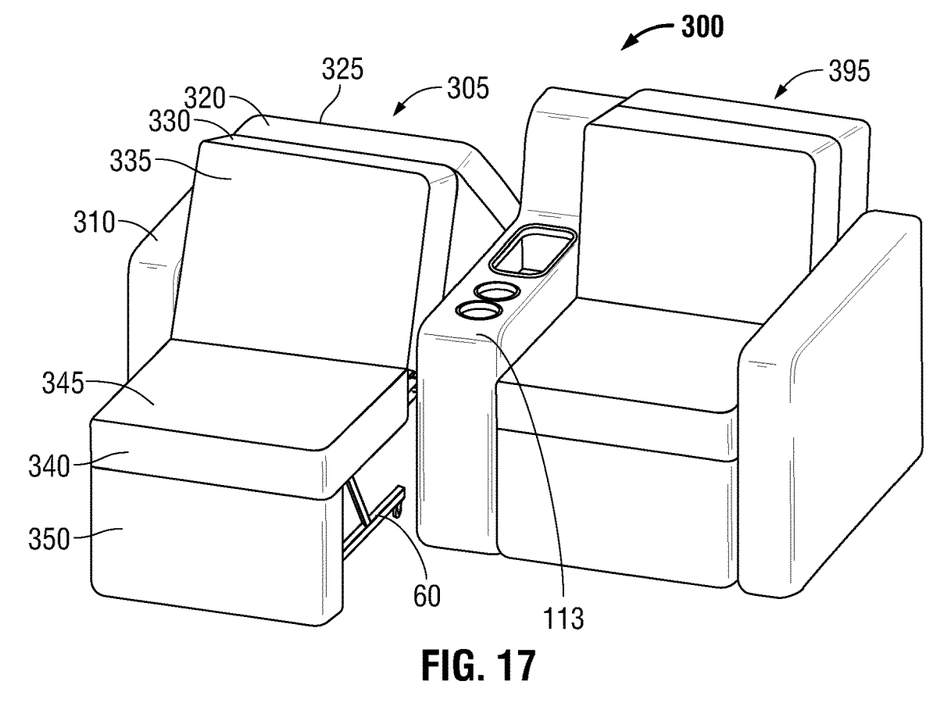
FIG. 17 is a perspective view of an exemplary twin sleeper in another partially extended position.
Figure 18:
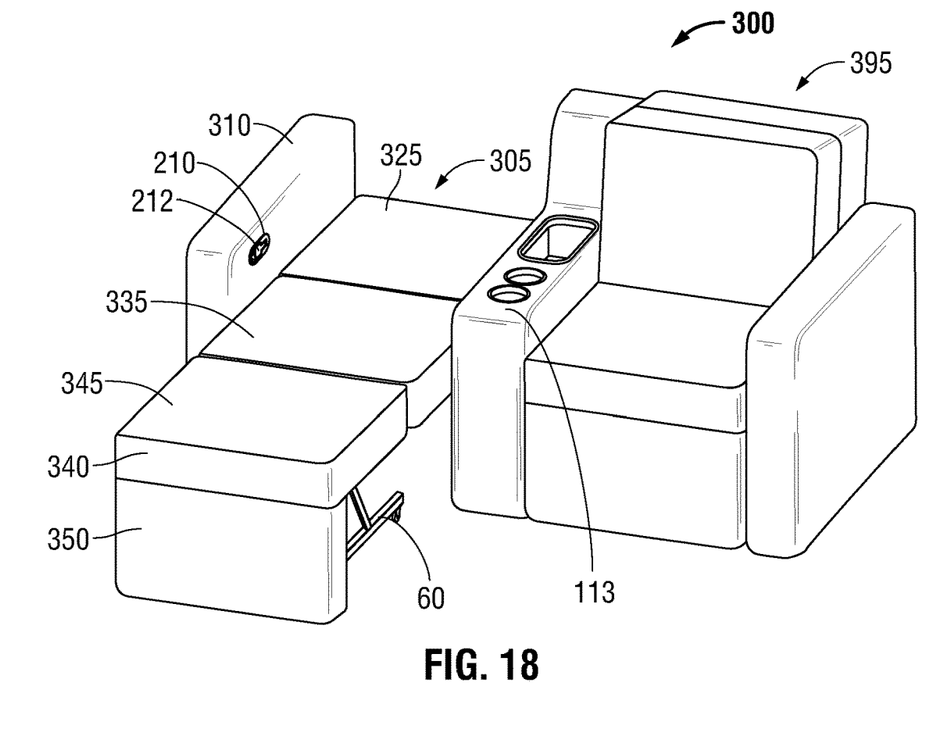
FIG. 18 is a perspective view of an exemplary twin sleeper in a final extended position.

Pulling on actuating lever 212 applies tension to actuator cable 220 (not shown), which releases wheel carriage 60 to move forward. FIGS. 16 and 17 show chair 305 in partially-extended positions as seat cushion 340 begins to move forward with wheel carriage 60 and as rear seat cushion 320 and back seat cushion 310 begin to unfold. FIG. 18 shows chair 305 extended so that cushion upper surface 325, back cushion upper surface 335, and seat cushion upper surface 345 form a bed.

In an alternative embodiment (not shown), the left side frame and/or right side frame of the twin sleeper include a support strut, a divider is interposed between left and right sleeper frame assemblies, and the divider includes at least one support member. In this embodiment, the rear frame assembly pivots are connected to the support struts in the left and right side frames and the support member(s) in the divider. In an embodiment the vertical support member in the divider is a support strut extending between and joined to a lower frame element and an upper rail or other frame element; and in another embodiment the support member in the divider is not joined to an upper rail or other frame element. In an embodiment, there is no obstruction or vertical structure in the divider between the left and right sleeper frame assemblies that protrudes above the level of the seat frame assemblies when extended, such that the left and right sleeper frame assemblies will form a double-wide bed frame when extended.

In an embodiment, twin sleeper 200 is a free-standing piece of furniture adapted for use inside or outside of a mobile vehicle. In an alternative embodiment, twin sleeper 200 is installed in a mobile vehicle such as a recreational vehicle, mobile home, bus, van, truck, ship, boat, or airplane. In an embodiment, left side frame 92 or right side frame 102 are structurally integrated with wall or other structural components of a recreational vehicle or other mobile vehicle. For example, support framework 40 could be joined to a wall of a recreational vehicle instead of the crosspiece of a side frame.

In an alternative embodiment, twin sleeper 200 includes a single sleeper frame assembly interposed between a left frame and a right frame, or three or more sleeper frame assemblies interposed between two or more dividers.

When it is disclosed that components of an embodiment are affixed to each other, it is to be understood that "affixing" includes any form or method of affixation known by a person of ordinary skill in the art to be suitable for connecting, joining, or coupling two components taking into consideration the materials and functions of the components, including but not limited to welding, adhesive bonding, or fastening with bolts, screws, nails, rivets, ties, wires, staples, or any other fastener.

Although embodiments of the present invention have been described, shown or illustrated in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A sleeper frame assembly comprising:
   a rear frame assembly comprising a rear frame upper surface;
   a back frame assembly coupled to the rear frame assembly, the back frame assembly comprising a back frame upper surface;
   a moveable seat assembly comprising a first support bracket, and a seat frame assembly comprising a seat frame upper surface;
   a sliding coupling connecting the back frame assembly to the first support bracket, wherein the sliding coupling comprises one or more slotted brackets, including a first slotted bracket comprising a slot,
   wherein the sleeper frame assembly is adapted and configured to form a closed position and an extended position, wherein in the closed position the back frame assembly and rear frame assembly are folded together, and in the extended position the back frame assembly and rear frame assembly are unfolded and aligned with the seat frame assembly such that the rear frame upper surface, the back frame upper surface, and the seat frame upper surface define a longitudinally-extending substantially planar bed frame.

2. The sleeper frame assembly of claim 1, wherein the first slotted bracket comprises two flanges, and the slot comprises aligned longitudinal openings in the flanges.

3. The sleeper frame assembly of claim 2, wherein the first slotted bracket comprises a web and two flanges.

4. The sleeper frame assembly of claim 1, wherein the sliding coupling comprises a pin connecting the first support bracket and the first slotted bracket.

5. The sleeper frame assembly of claim 4, wherein the pin extends through the slot in the first slotted bracket.

6. The sleeper frame assembly of claim 5, wherein the sliding coupling is adapted and configured so that the pin slides in the slot as the sleeper frame assembly extends from the closed position to the extended position.

7. The sleeper frame assembly of claim 1, wherein the first slotted bracket is pivotably coupled to the back frame assembly.

8. The sleeper frame assembly of claim 1, wherein the first support bracket comprises a longitudinally-extending internal cavity large enough to receive a longitudinally-extending portion of the first slotted bracket.

9. The sleeper frame assembly of claim 8, wherein the slot of the first slotted bracket is nested within the longitudinally-extending internal cavity of the first support bracket.

10. The sleeper frame assembly of claim 1, wherein the sliding coupling is adapted and configured so that when the sleeper frame assembly is in the extended position, a longitudinally-extending portion of the first slotted bracket nests within a longitudinally-extending cavity in the first support bracket.

11. The sleeper frame assembly of claim 1, wherein the first slotted bracket comprises a flanged beam.

12. The sleeper frame assembly of claim 1, further comprising a rear cushion, a back cushion, and a seat cushion, wherein in the extended position the rear cushion, back cushion, and seat cushion form a bed.

13. A twin sleeper, comprising a twin sleeper frame and a divider interposed between a first sleeper frame assembly, as set forth in claim 1, and a second sleeper frame assembly, as set forth in claim 1.

14. The twin sleeper of claim 13, wherein the divider comprises a console.

15. The twin sleeper of claim 13, wherein the twin sleeper is installed in a vehicle.

16. The twin sleeper of claim 15, wherein the vehicle is a recreational vehicle, mobile home, van, bus, truck, airplane, boat, or ship.

17. The twin sleeper of claim 13, wherein the first sleeper frame assembly is connected to the frame of the vehicle.

18. The twin sleeper of claim 13, wherein the moveable seat assembly of the first sleeper frame assembly is adapted and configured to move forward relative to the twin sleeper frame as the first sleeper frame assembly extends from the closed position to the extended position.

19. The twin sleeper of claim 18, wherein a latch couples the moveable seat assembly to the twin sleeper frame when the first sleeper frame assembly is in the closed position.

* * * * *